UNITED STATES PATENT OFFICE.

JAMES B. BARNARD, OF GARRETTSVILLE, OHIO.

PAINT FOR ROOFS.

SPECIFICATION forming part of Letters Patent No. 252,171, dated January 10, 1882.

Application filed September 19, 1881. (No specimens.)

*To all whom it may concern:*

Be it known that I, JAMES B. BARNARD, a citizen of the United States, residing at Garrettsville, in the county of Portage and State of Ohio, have invented a new and useful Paint for Roofs, of which the following is a specification.

My paint is composed of the following ingredients: one-third part of residuum of petroleum-refineries and one-third part each of rosin and naphtha of commerce, with one-half a pound of ground slate and one and a half pound of English Venetian red, and half a pound of Turkey red to make a good red color. In preparing it the residuum and rosin are melted together with heat, and when nearly cold the naphtha is added, the ground slate and coloring-matter being put in when most convenient and well mixed, forming a homogeneous mass or paint, the oxides of iron of the aforesaid coloring-matter giving a drying quality to the composition, and causing it to dry without the stickiness so common to compounds of residuum and rosin as heretofore used. For shingles or wood-work it is best applied warm, making a paint or stain of great penetrating power, filling the pores of the wood with the solution, that unites with its fibers, and gradually becomes tough and elastic, shutting out moisture and rendering it impervious to the weather, and to a great extent fire-proof against sparks and cinders.

For metallic roof and similar work less naphtha and rosin may be used, and the paint applied cold, if preferred.

The proportions given are found to make a good substantial paint or stain when applied as stated, though the exact proportions are not necessary, the residuum and rosin being the principal ingredients, the others admitting of much more variation.

The residuum I use, sometimes called "petroleum-tar," I am informed, is what is left of crude petroleum after the burning-oils are extracted, its well-known preserving qualities on wood and its powerful penetrating nature making it peculiarly well adapted for shingle roofs.

Having thus fully described my invention, what I claim as new, and desire to patent, is—

The above-described composition or roof-paint, consisting of residuum, rosin, naphtha, and oxides of iron, substantially in the manner and for the purposes above set forth.

J. B. BARNARD.

Witnesses:
 KELO WANN,
 J. G. ARNOLD.